(12) United States Patent
Ravuru

(10) Patent No.: US 11,785,305 B2
(45) Date of Patent: Oct. 10, 2023

(54) TARGET USER IDENTIFICATION AND MANAGEMENT OF DISTRIBUTED AND PUBLISHED CONTENT

(71) Applicant: META PLATFORMS, INC., Menlo Park, CA (US)

(72) Inventor: Rakesh Ravuru, San Jose, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 0 days.

(21) Appl. No.: 17/133,774

(22) Filed: Dec. 24, 2020

(65) Prior Publication Data

US 2022/0210515 A1 Jun. 30, 2022

(51) Int. Cl.
H04N 21/47 (2011.01)
H04N 21/472 (2011.01)
H04N 21/25 (2011.01)
H04N 21/254 (2011.01)
H04N 21/258 (2011.01)
H04N 21/4722 (2011.01)

(52) U.S. Cl.
CPC ..... *H04N 21/47202* (2013.01); *H04N 21/251* (2013.01); *H04N 21/254* (2013.01); *H04N 21/25866* (2013.01); *H04N 21/4722* (2013.01)

(58) Field of Classification Search
CPC .................................................. H04N 21/40
See application file for complete search history.

(56) References Cited

U.S. PATENT DOCUMENTS 8,856,232 B1 10/2014 Swerdlow et al.
8,863,173 B2 * 10/2014 Jing ..................... H04N 21/632
725/34
9,417,765 B1 * 8/2016 Lewis ................. H04N 21/4788
9,865,006 B2 1/2018 Reis et al.
10,373,212 B2 8/2019 Systrom et al.
10,412,026 B2 * 9/2019 Sherrets ................ H04L 67/535
10,477,271 B1 * 11/2019 Higbee .............. H04N 21/2668
10,652,606 B2 5/2020 Barnett et al.
(Continued)

OTHER PUBLICATIONS

Todd Bishop, "This New Facial Recognition Extension IDs Celebrities in Videos—and It's Actually Pretty Useful", Dot.LA, Jun. 3, 2020, 8 pages. https://dot.la/realnetworks-facia-recognition-tech-ids-celebrities-in-videos-and-its-actually-pretty-useful-2646151892.html.

(Continued)

*Primary Examiner* — Mushfikh I Alam
(74) *Attorney, Agent, or Firm* — Mannava & Kang, P. C.

(57) ABSTRACT

According to examples, a system for identifying target users in a content item from a first location and distributing the content item to a second location may include a processor and a memory storing instructions. The processor, when executing the instructions, may cause the system to receive information associated with a content item published in a first location and receive information associated with a target user associated with the content item. The processor may further determine, based on the information associated with the content item and the information associated with the target user, if the content item should be distributed to a second location. The processor may then prepare the content item for distribution to the second location and distribute the content item to the second location to publish a distributed content item.

20 Claims, 4 Drawing Sheets

(56) References Cited

U.S. PATENT DOCUMENTS

| | | | |
|---|---|---|---|
| 10,685,257 B2 | 6/2020 | Bapat et al. | |
| 2007/0265923 A1* | 11/2007 | Krassner | G06Q 30/0275 705/14.54 |
| 2013/0159110 A1* | 6/2013 | Rajaram | G06Q 50/01 705/14.66 |
| 2014/0053212 A1* | 2/2014 | Shoykher | G06F 3/04817 725/59 |
| 2014/0150016 A1* | 5/2014 | Feng | G06Q 30/0255 725/34 |
| 2015/0317562 A1* | 11/2015 | Srinivasan | G06N 20/10 706/11 |
| 2016/0314524 A1* | 10/2016 | Trindade de Sousa Monteiro | G06Q 30/08 |
| 2017/0127128 A1* | 5/2017 | Seger | G06F 16/2282 |
| 2017/0250931 A1 | 8/2017 | Ioannou et al. | |
| 2018/0145840 A1* | 5/2018 | Advani | H04L 51/32 |
| 2018/0192094 A1* | 7/2018 | Barnett | H04N 21/6125 |
| 2019/0261064 A1* | 8/2019 | Ojala | H04N 21/8358 |
| 2020/0082126 A1* | 3/2020 | Brown | H04N 21/23473 |
| 2020/0106734 A1* | 4/2020 | Pappu | G06F 16/335 |
| 2020/0126100 A1* | 4/2020 | Goyal | G06F 16/285 |
| 2021/0400348 A1* | 12/2021 | Mixter | H04N 21/4532 |

OTHER PUBLICATIONS

Yucel et al., "Wildest Faces: Face Detection and Recognition in Violent Settings", May 19, 2018, 14 pages.

Lee, et al., "Implementation of a Celebrity Face Recognition AI for Video Metadata Generation", Korean Broadcasting System (KBS), Sep. 15, 2020, 7 pages.

European Search Report for European Patent Application No. 21214536.1, dated May 18, 2022, 10 pages.

\* cited by examiner

TARGET USER IDENTIFICATION AND MANAGEMENT OF DISTRIBUTED AND PUBLISHED CONTENT

TECHNICAL FIELD

This patent application relates generally to identification of users and distribution of content items, and more specifically, to systems and methods for identifying a qualified user associated with content being published at a first location, distributing the content at a second location, and utilizing moderation mechanisms to manage and moderate the distributed content.

BACKGROUND

With recent advances in technology, the prevalence and proliferation of content creation and delivery has increased rapidly in recent years. Users of mobile computing devices, for example, are being flooded with content provided by any number of content distributors. As a result, content distributors are continuously looking for ways to reach audiences over a variety of platforms.

One way for a content distributor to ensure delivery of their content may be to establish a content delivery and management relationship with users. In one example, a user may "subscribe" to an account associated with the content distributor to secure delivery of content.

In some instances, an entity of interest (e.g., a celebrity or a well-known figure or item) may be included in content published by a user or third party. Such content may draw larger audience interest, but may remain relatively unregulated. For example, the entity of interest, who may or may not be keen on keeping a particular online or digital image, may be entirely unaware of its existence and may miss out on further opportunity to sculpt his or her presence. Unless the user or third party tags the entity of interest, current systems and methods, the entity of interest may often be unaware who the third party is or even that the content is being generated or published. In this case, without a delivery or management relationship with the user or third party, content associated with the entity of interest may not be properly managed, curated, or distributed.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1A:
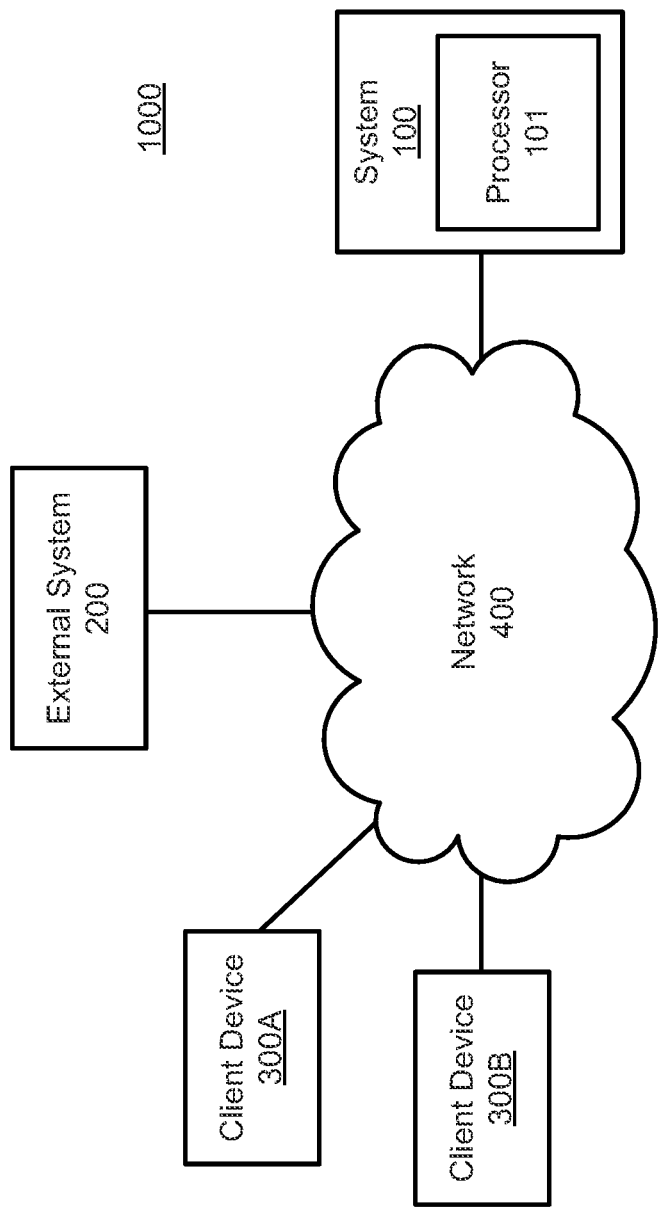
FIG. 1A illustrates a block diagram of a system environment, including a system, that may be implemented to identify target users in a content item from a first location and distribute the content item to a second location, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Advances in content management and media distribution are causing users to consume content from a variety of content platforms. With the proliferation of different types of digital content delivery mechanisms (e.g., mobile phone devices, tablet devices, etc.), it has become crucial for a content distributor to find new ways to facilitate user engagement with delivered content.

A content platform may typically be provided by a service provider, and content on the content platform may typically be shared by a first user (also "content distributor") to one or more other users of the platform. As used herein, a "user" may include any user of a computing device or digital content delivery mechanism who receives or interacts with delivered content items, which may be visual, non-visual, or a combination thereof. Also, as used herein, "content," "digital content," "digital content item," and "content item" may refer to any digital data (e.g., a data file). Examples of such content items may include, but are not limited to, textual data, images, video, audio, and/or other related streaming content. Additionally, the terms "content," "digital content item," "content item," and "digital item" may refer interchangeably with the digital content items themselves or portions thereof. Examples of types of content that may be shared over various content platforms may include audio (e.g., podcasts, music), video (e.g., music videos, variety shows, etc.), and text (e.g., micro-blogs, blogs, etc.).

One way to ensure delivery of content may be for a user to establish a delivery relationship with a content distributor. One example of such a relationship facilitated by a content platform may enable a user to "subscribe" to a "channel" associated with the content distributor. In another example, a user may "follow" an account or profile associated with the content distributor. Typically, once a delivery relationship may be established, any content generated by the content distributor may be delivered automatically to the user for access.

One content type often favored by users may be "live" content. As used herein, live content may include any content published in real-time. Users may, in some instances, prefer the real-time experience offered by live content as it may offer an unfiltered and synchronous experience that may be, among other things, authentic and compelling. Live content published over content platforms may take numerous forms. In one example, live content may take the form of a discussion with another party (e.g., a podcast). In another example, live content may take the form of a live event (e.g., a concert, a sporting event, etc.).

To facilitate publishing and distribution of live content, a service provider may enable continuous transmission (e.g., "streaming" or "streamcasting") of data over a content platform to a user (e.g., an end-user). In one example, to access the live content stream, the user may select an image thumbnail associated with live content on the user's content "feed."

However, due to the exigent nature of live content, users seeking to view the live content may be required to make themselves available prior to or during live streaming. Consequently, content distributors may endeavor, in various ways, to make users aware of upcoming or current live content. One such example may be a notification issued to users of a platform prior to or during streaming of an event by a content distributor. In some examples, the notification may be issued by the content distributor, while in others it may be issued (e.g., automatically) from the content platform. Also, in some examples, the notification may be issued prior to a scheduled start of a live stream event in some cases, while in other cases, it may be issued in real-time while the event may be underway.

Nevertheless, despite these provisions, a user may still remain unaware of content of interest. One such example may be in the case of content including an entity of interest to the user. As used herein, an "entity of interest" may include, but not limited to, any entity included in a content item published by a third party, and may be also hereinafter referred to as a "target user." In some examples, this "target user" may be a celebrity, an influencer, or a well-known user that has a particular or sizeable online following. Since the content may be generated by a third party, the target user may be wholly unaware that the content may be being generated. Consequently, the target user may be unable to notify his or her interested users. One such example may be an awards ceremony being streamed live on a content platform (e.g., a social media platform) by a third party (e.g., an entertainment conglomerate or a fan). The awards ceremony may be attended by one or more celebrities with large followings (e.g., online). A celebrity attending may be unable and/or unwilling to distribute content relating to the awards ceremony, and may further be unaware of the third party's streaming of the awards ceremony. As a result, the celebrity may have no way to let his or her interested users know that he or she is attending this event, and unless the user has an established delivery relationship with the third party, the user may miss out on this opportunity to associate with this particular content. In some examples, the celebrity may not want to be associated with this content by the third party user as well. Current systems do not provide a way for the celebrity to manage this content that contains his or her image or likeness either.

Systems and methods described may describe identifying a target user in content published by a third party at a first location and distributing the content to a second location. In some examples, the systems and methods may include analyzing a content item from a source location to identify a target user. In these examples, to identify the target user, the systems and methods may utilize various techniques including computer vision, machine learning (ML), and artificial intelligence (AI). In some examples, the systems and methods may also include distributing a content item from a source location to a target location. In one example, to distribute the content item to a target location, the systems and methods may evaluate associated criteria to determine if the content item should be distributed to the target location, prepare and distribute the content item to the second location, and notify users that the content item may be available at the second location. Furthermore, in some examples, the systems and methods may include implementing moderation mechanisms to moderate publishing of a content item at a target location. In one example, to moderate the publishing, the systems and methods may select a user moderator, aggregate user experience information including feedback from the user moderator, and determine whether to continue distributing the content item. Accordingly, the systems and methods described may provide an interested user content that otherwise may not have been accessible. Moreover, the systems and methods may also generate content on behalf of a target user by automatically distributing content associated with the target user.

Figure 1B:
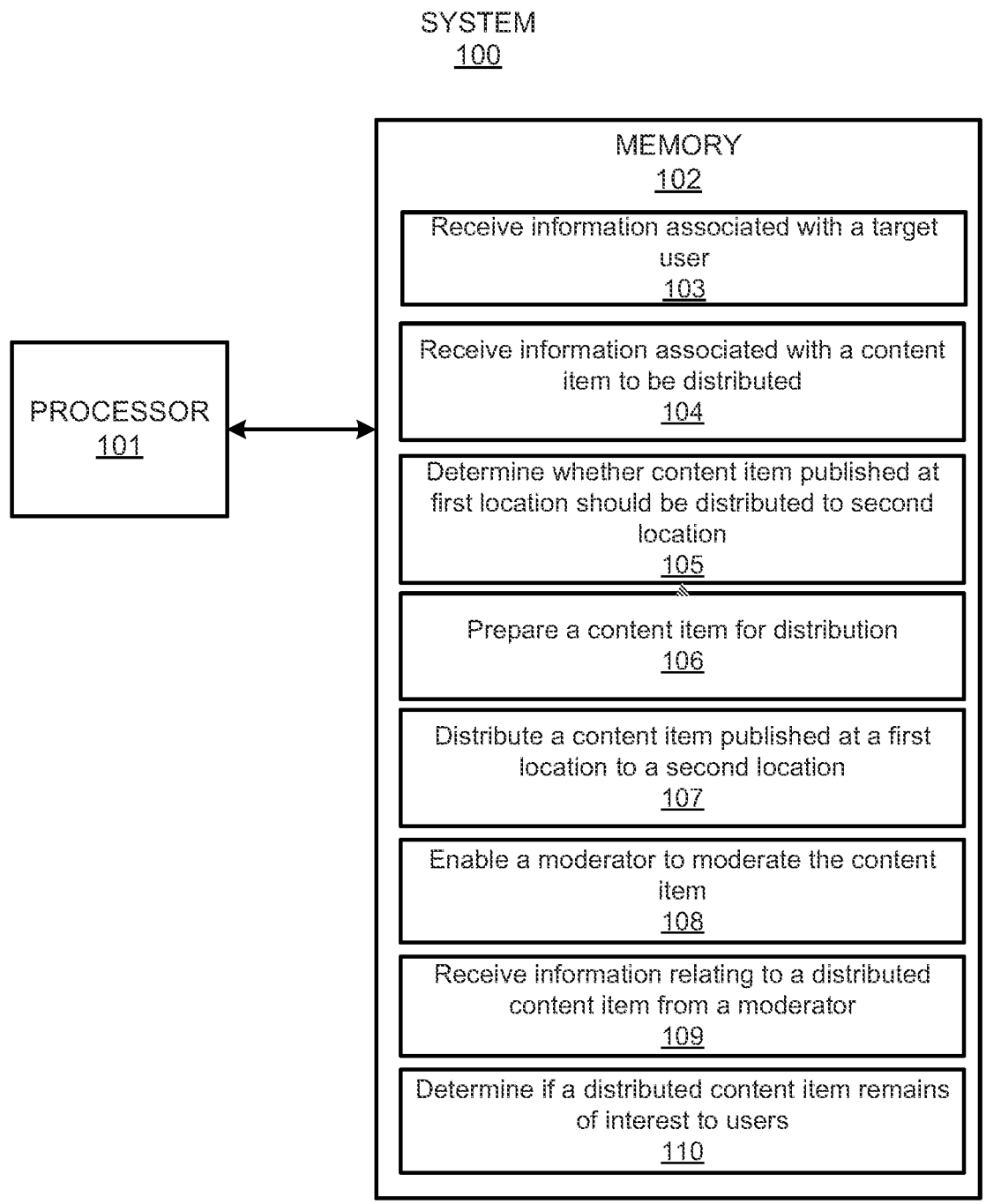
FIG. 1B illustrates a block diagram of the system that may be implemented to identify target users in a content item from a first location and distribute the content item to a second location, according to an example.

Reference is now made to FIGS. 1A-B. FIG. 1A illustrates a block diagram of a system environment, including a system, that may be implemented to identify target users in a content item from a first location and distribute the content item to a second location, according to an example. FIG. 1B illustrates a block diagram of the system that may be implemented to identify target users in the content item from a first location and distribute the content item to a second location, according to an example.

As will be described in the examples below, one or more of system 100, external system 200, client devices 300A-B and system environment 1000 shown in FIGS. 1A-B may be operated by a service provider to, among other things, identify a target user in a content item from a source location, distribute the content item to a target location, and utilize content moderation mechanisms to moderate the publishing. It should be appreciated that one or more of the system 100, the external system 200, the client devices 300A-B and the system environment 1000 depicted in FIGS. 1A-B may be provided as examples. Thus, one or more of the system 100, the external system 200 the client devices 300A-B and the system environment 1000 may or may not include additional features and some of the features described herein may be removed and/or modified without departing from the scopes of the system 100, the external system 200, the client devices 300A-B and the system environment 1000 outlined herein. Moreover, in some examples, the system 100, the external system 200, and/or the client devices 300A-B may be or associated with a social networking system, a content sharing network, an advertisement system, an online system, and/or any other system that facilitates any variety of digital content in personal, social, commercial, financial, and/or enterprise environments.

While the servers, systems, subsystems, and/or other computing devices shown in FIGS. 1A-B may be shown as single components or elements, it should be appreciated that one of ordinary skill in the art would recognize that these single components or elements may represent multiple components or elements, and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the system 100, the external system 200, the client devices 300A-B or the system environment 1000.

It should also be appreciated that the systems and methods described herein may be particularly suited for digital content, but are also applicable to a host of other distributed content or media. These may include, for example, content or media associated with data management platforms, search or recommendation engines, social media, and/or data communications involving communication of potentially personal, private, or sensitive data or information. These and other benefits will be apparent in the descriptions provided herein.

In some examples, the external system 200 may include any number of servers, hosts, systems, and/or databases that store data to be accessed by the system 100, the client devices 300A-B, and/or other network elements (not shown) in the system environment 1000. In addition, in some examples, the servers, hosts, systems, and/or databases of the external system 200 may include one or more storage mediums storing any data. In some examples, and as will be discussed further below, the external system 200 may store information (e.g., user information) that may relate to target user identification and distribution of published content.

In some examples, and as will be described in further detail below, the client devices 300A-B may be utilized to, among other things, identify a target user in content published by a third party at a first location and distribute the content to a second location for access by an interested user. So, in one example, the client device 300A may be utilized by a first user to publish content on a content platform that includes a target user (e.g., a celebrity). In this example, the first user may distribute the content from an account on the content platform associated with the first user. Also, in this example, the client device 300B may be utilized by a user moderator to view and moderate the distributed content on an account associated with the target user.

In some examples, the client devices 300A-B may be electronic or computing devices configured to transmit and/or receive data. In this regard, each of the client devices 300A-B may be any device having computer functionality, such as a television, a radio, a smartphone, a tablet, a laptop, a watch, a desktop, a server, or other computing or entertainment device or appliance. In some examples, the client devices 300A-B may be mobile devices that are communicatively coupled to the network 400 and enabled to interact with various network elements over the network 400. In some examples, the client devices 300A-B may execute an application allowing a user of the client devices 300A-B to interact with various network elements on the network 400. Additionally, the client devices 300A-B may execute a browser or application to enable interaction between the client devices 300A-B and the system 100 via the network 400.

The system environment 1000 may also include the network 400. In operation, one or more of the system 100, the external system 200 and the client devices 300A-B may communicate with one or more of the other devices via the network 400. The network 400 may be a local area network (LAN), a wide area network (WAN), the Internet, a cellular network, a cable network, a satellite network, or other network that facilitates communication between, the system 100, the external system 200, the client devices 300A-B and/or any other system, component, or device connected to the network 400. The network 400 may further include one, or any number, of the exemplary types of networks mentioned above operating as a stand-alone network or in cooperation with each other. For example, the network 400 may utilize one or more protocols of one or more clients or servers to which they are communicatively coupled. The network 400 may facilitate transmission of data according to a transmission protocol of any of the devices and/or systems in the network 400. Although the network 400 is depicted as a single network in the system environment 1000 of FIG. 1A, it should be appreciated that, in some examples, the network 400 may include a plurality of interconnected networks as well.

In some examples, and as will be discussed further below, the system 100 may, among other things, identify a target user in a content item published at a first location, distribute the content item to a second location, and utilize moderation mechanism to moderate the publishing. In some examples, the system 100 may be operated by a service provider as part of a content platform (e.g., a social media platform). Details of the system 100 and its operation within the system environment 1000 will be described in more detail below.

As shown in FIGS. 1A-D, the system 100 may include processor 101 and the memory 102. In some examples, the processor 101 may execute the machine-readable instructions stored in the memory 102. It should be appreciated that the processor 101 may be a semiconductor-based microprocessor, a central processing unit (CPU), an application specific integrated circuit (ASIC), a field-programmable gate array (FPGA), and/or other suitable hardware device.

In some examples, the memory 102 may have stored thereon machine-readable instructions (which may also be termed computer-readable instructions) that the processor 101 may execute. The memory 102 may be an electronic, magnetic, optical, or other physical storage device that contains or stores executable instructions. The memory 102 may be, for example, Random Access memory (RAM), an Electrically Erasable Programmable Read-Only Memory (EEPROM), a storage device, an optical disc, or the like. The memory 102, which may also be referred to as a computer-readable storage medium, may be a non-transitory machine-readable storage medium, where the term "non-transitory" does not encompass transitory propagating signals. It should be appreciated that the memory 102 depicted in FIG. 1B may be provided as an example. Thus, the memory 102 may or may not include additional features, and some of the features described herein may be removed and/or modified without departing from the scope of the memory 102 outlined herein.

It should be appreciated that, and as described further below, the processing performed via the instructions on the memory 102 may or may not be performed, in part or in total, with the aid of other information and data, such as information and data provided by the external system 200 and/or the client devices 300A-B. Moreover, and as described further below, it should be appreciated that the processing performed via the instructions on the memory 102 may or may not be performed, in part or in total, with the aid of or in addition to processing provided by other devices, including for example, the external system 200 and/or the client devices 300A-B.

In some examples, the memory 102 may store instructions, which when executed by the processor 101, may cause the processor to: gather 103 information relating to a target user; gather 104 information associated with distribution of a content item; determine 104 whether a content item published at a first location may be distributed to a second location; and prepare 106 a content item for distribution. In addition, the instructions, when executed by the processor 101, may further cause the processor to distribute 107 a content item published at a first location to a second location; receive 109 information relating to a distributed content item from a moderator; and determine 110 if a distributed content item remains of interest to users.

As used herein, any and all features associated with and/or enabled by the instructions 103-110 may be referred to as "distribution features". In one example, the instructions 103-110 and the associated distribution features may be implemented as part of a content platform (e.g., a social media platform) provided by a service provider.

In some examples, the instructions 103 may gather information relating to a target user, and may include any information that may be relevant to determining whether to distribute a content item. In some examples, the instructions 103 may gather personal information relating to a target user. Examples may include demographic information (e.g., age, gender, etc.), preference information (e.g., viewing history, purchase history), a following associated with the target user (e.g., a number of followers), and a type of content (e.g., category) that may be associated with the target user. In one example, the information may be stored on and accessed from the external system 200.

In some examples, the instructions 103 may gather information to determine whether the user may be availed use of the distribution features. It should be appreciated that, in some examples, a service provider associated with a content platform may issue eligibility criteria to determine users that may be availed use of the distribution features.

To determine eligibility, the instructions 103 may utilize one or more eligibility criteria. A first example of such eligibility criteria may be a following requirement. In one example, the instructions 103 may determine that if the target user has a minimum of 200,000 followers (or other similar threshold which may be predetermined and customized), the target user may be eligible. A second example of such eligibility criteria may include a status associated with and/or conferred to the target user. Examples of users that may be conferred such status may include a celebrity (e.g., with a large offline following), a social media influencer (e.g., with a large online following), a politician, media, or other public figure.

In some examples, the instructions 103 may determine whether a user has purchased access to the distribution features. In one example, the instructions 103 may provide an interface describing a purchase structure in the target user's profile (e.g., in the "settings" portion), and the target user may utilize the interface to submit payment information to become eligible.

In some examples, upon determining that a target user may be eligible, the instructions 103 may receive an indication that the target user has "activated" the distribution features. In one example, to activate the distribution features, the instructions 103 may provide an "opt-in" button on the target user's profile (e.g., in the settings portion). Upon activation, the instructions 103 may provide information associated with use of the distribution features, including usage guidelines and requirements.

In some examples, the instructions 103 may enable a target user to indicate a preference relating to distribution of a content item. In one example, the instructions 103 may provide an interface in the target user's profile (e.g., in the settings portion) that may enable the target user to indicate preference information. It should be appreciated that the instructions 103 may also enable a target user to indicate restrictions as well.

In some examples, the instructions 103 may enable a target user to indicate a preference relating to subject matter of a content item. In one example, the instructions 103 may enable the target user to specify aspects relating to an appearance of the target user in the content item to be distributed. In this example, the target user may specify a preference for interviews and podcasts, but not casual interactions.

In other examples, the instructions 103 may enable the target user to indicate a preference relating to aspects of a content item. In one example, the target user may specify a preference relating to location, ambiance (e.g., noise level, mood, atmosphere, etc.) and settings (e.g., time of day, indoors/outdoors, etc.) associated with the content item.

The instructions 103 may also, in some examples, enable a target user to indicate a preference relating to an audience. In one example, the target user may indicate a preference relating to demographic aspects (e.g., age, gender, etc.) of an audience. In another example, the target user may indicate a preference based on location of an audience or interests of an audience.

Furthermore, in some examples, the instructions 103 may enable a target user to indicate a preference associated with quality (e.g., audio, visual, etc.) of a content item. In one example, the target user may specify a minimum video and/or audio quality for the content item. In another example, the target user may specify resolution requirements for the content item (e.g., high definition, standard definition, etc.).

In some examples, the instructions 104 may gather information associated with a content item that may be distributed. It should be appreciated that, to gather the information relating to the content item, the instructions 104 may analyze the content item in real-time (e.g., a live stream). It should further be appreciated that the instructions 104 may analyze the content item while simultaneously analyzing other content items, and may simultaneously analyze one or more one content items with respect to a particular target user as well.

In some examples, the instructions 104 may analyze a content item to identify a target user. It should be appreciated that to identify the target user in the content item, the instructions 104 may be configured to incorporate, among other things, computer vision, artificial intelligence (AI) or deep learning techniques. In some examples, to identify a target user, the instructions 104 may implement facial recognition. In one example, determining the identity of the target user via facial recognition may include scoring one or more comparisons of captured images, and taking a highest ranked (i.e., scored) comparison as a likeliest match. To further narrow possible identities, the instructions 104 may also, in some cases, access user information relating to one or more users of the content platform (e.g., from the external device 200). In another example, the instructions 104 may utilize various mapping and/or filtering techniques to narrow possible identities to match to the target user as well.

In some examples, to perform facial analysis, the instructions 104 may implement facial expression analysis to determine a state or status of a target user. In one example, the instructions 104 may analyze an activity associated with the target user. For example, the instructions 104 may determine if the target user may be in conversation with another person or if the target user may be dancing. In another example, the instructions 104 may analyze aspects of appearance of the target user determine a "mood" (e.g., happy, sad, etc.).

In some examples, the instructions 104 may implement facial tagging to maintain a determined identity of an target user. In one example, the instructions 104 may determine if the target user may be moving in or out of the imagery range of content item. As discussed below, this information may be utilized to determine when to, for example, begin or end distribution of the content item.

In some examples, the instructions 104 may identify a context associated with a content item. In one example, to identify a context, the instructions 104 may analyze a background in the content item. In this example, to analyze the background, the instructions 104 may detect an object in the background (e.g., an landmark, a building, etc.) and associate a context based on the detected object.

In some examples, the instructions 104 may identify a setting associated with a content item. To identify the setting, the instructions 104 may gather and analyze information relating to circumstantial aspects that may be associated with a setting. Examples of such information may include, among other things, a location (e.g., an address), a time or weather conditions that may be associated with the content item.

In some examples, the instructions 104 may also determine characteristics and aspects of a content item. It should be appreciated that characteristics and aspects of the content item may be qualitative or quantitative in nature. In one example, the instructions 104 may analyze the content item to determine a video and/or audio quality or data format of the content item. In another example, the instructions 104 may analyze the content item to associate a category (e.g., entertainment, politics, etc.) associated with the content item. In yet another example, the instructions 104 may determine a content type (e.g., interview, performance, sporting event, etc.).

In some examples, the instructions 105 may determine whether a content item published at a first (i.e., source) location may be distributed to a second (i.e., target) location. To determine if the content item may be published to the second location, the instructions 105 may analyze one or more distribution criteria. In one example, the distribution criteria may include consideration of the target user's preferences (e.g., gathered via the instructions 103). For example, the target user may have indicated a preference that only interviews and podcasts may be distributed. Accordingly, in this example, the instructions 105 may analyze the content item (e.g., gathered via the instructions 104) to determine whether the content item being published may be an interview or a podcast, and may determine whether the content item should be distributed accordingly.

In some examples, the instructions 105 may analyze distribution criteria associated with a content platform. In one example, the distribution criteria associated with the content platform may include a minimum audio and video quality for the content item to distributed. In another example, the distribution criteria associated with the content platform may specify types of inappropriate content.

It should be appreciated that, to determine whether a content item should be distributed, the instructions 105 may analyze one or more distribution criteria. In analyzing a plurality of distribution criteria, the instructions 105 may associate a "weight" value to each of criteria to indicate a significance. It should be appreciated that to analyze the distribution criteria, the instructions 104 may incorporate, among other things, machine learning (ML), artificial intelligence (AI) or deep learning techniques.

In some example, the instructions 106 may prepare a content item for distribution. In one example, the instructions 106 may generate descriptive information for the content item. Examples of descriptive information may include a title, a content description and a number of current viewers. To generate the descriptive information, the instructions 106 may utilize any information associated with the content item (e.g., as gathered via the instructions 104) and may implement various technologies, including location determination, natural-language processing, and computer vision technologies. In another example, the instructions 106 may prepare a notification informing users that the content item may be published.

In some examples, the instructions 107 may distribute a content item published at a first (i.e., source) location to a second (i.e., target) location. In one example, if it has been determined that the content item should be distributed (e.g., via the instructions 105) and the content item has been prepared for distribution (e.g., via the instructions 106), the instructions 107 may distribute the content item to the second location (i.e., the "distributed content item"). In one example, to distribute the content item to the second location, the instructions 107 may display (i.e., "highlight") the content item on an profile associated with the target user. In another example, the instructions 107 may also provide an a button for a user to select on a content "feed" to begin viewing the content item. In this manner, the instructions 107 may distribute (also "cross-post") content including a target user and generated by a third party to a location associated with the target user. Accordingly, in some examples, the instructions 107 may provide a user with content of interest (e.g., a live stream) that otherwise may not have been available. Moreover, in these examples, the instructions 107 may also generate personal content on behalf of and with minimal effort from the target user.

It should be appreciated that, in some examples, the instructions 107 may distribute a content item immediately (or "automatically") upon determining that the content item should be distributed, while in other examples the instructions 107 may distribute the content item upon further consideration (e.g., approval by the target user). Furthermore, in one example, the instructions 107 may also transmit a prepared notification (e.g., as generated via the instructions 106) to notify users of the publication of the content item.

In some examples, the instructions 107 may distribute a content item to a content platform other than the content platform on which the content item may be being distributed. In one example, to enable posting of content from a first content platform to a second content platform, a service provider associated with the first content platform may have an established collaboration with a service platform associated with the second content platform. In one example, if the established collaboration may be in place, the instructions 107 may distribute a content item published on an account by a third party on a first content platform onto a second content platform to an account associated with a target user. In some examples, the first content platform may be or may not be the same as the second content platform. In the event the first content platform is the same as the second content platform, the systems and methods described herein may provide greater reach to its users when republishing or distributing the content items at the first and second locations. In the event the first content platform is different from the second content platform, the systems and methods described herein may also provide greater reach to its users on other online platforms when republishing or distributing the content items at the first and second locations. Either way, the systems and methods described herein may provide intra- or cross-platform interoperability to enhance distribution and management of relevant content items to users.

In some examples, the instructions 108 may enable a moderator to moderate a content item. As used herein, "moderate" may include any expression or opinion relating to a content item from a moderator. In one example, to select a moderator, the instructions 108 may analyze information relating to one or more users on a content platform and may evaluate the information according to one or more moderator criteria. Examples of moderator criteria may include a degree of engagement (e.g., with the target user's content), activity patterns, and demographic criteria (e.g., age, gender, etc.). Moderator criteria may be provided by a content platform, by a target user, or by a combination thereof. It should be appreciated that, to enable selection of a moderator, the instructions 108 may implement various selection methods and utilize various technologies, including machine-learning (ML) techniques, heuristics (e.g., associated with levels of engagement), and artificial intelligence (AI). In this example, the instructions 108.

In some examples, the instructions 108 may select a moderator without input from the target users or may present candidates to the target user for approval. In other examples, the instructions 108 may enable a target user to manually add a moderator, or may enable a user to apply to be a moderator.

In some examples, the instructions 109 may receive information relating to a distributed content item from a moderator. In some examples, the instructions 109 may enable a moderator to provide an opinion or experience (i.e., "feedback") relating to the distributed content item via one or more feedback mechanisms. Examples of these feedback mechanisms may include buttons (e.g., like/dislike buttons), comments, polls and surveys. In one example, the instructions 109 may provide a moderator a button to indicate like/dislike of the content item. In another example, the instructions 109 may provide a moderator a selectable button (e.g., on a content window displaying the content item) to indicate that the content item is inappropriate and/or should no longer be published.

In some examples, the instructions 109 may also analyze feedback to determine whether to continue distributing the content item. In this example, the feedback utilized may come from users and/or moderators. In one example, the instructions 109 may aggregate feedback from individual users and/or moderators to determine whether to continue distributing the content item. In another example, the instructions 109 may implement a threshold, wherein if feedback for a content item goes above (or below) the threshold, the content item may be discontinued.

In one example, where distribution of the content item may be discontinued, the instructions 109 may store any information relating to the discontinuation for further analysis. For example, the instructions 109 may utilize data associated with discontinuing distribution of the content item to build and/or "train" a machine learning (ML) model to determine if another (future) content item may be of interest to users.

In one example, the instructions 109 may also receive recommendation information from a user and/or moderator relating to a content item that may be distributed. In one example, the instructions 109 may enable a moderator to recommend (i.e., "flag") content for distribution. In this example, the instructions 109 may access and analyze the content item, and may determine whether the distribute the suggested content item. In another example, if a sufficient number of moderators identify and/or recommend a content item, the instructions 109 may distribute the content immediately and/or without further analysis.

In some examples, the instructions 110 may determine if a distributed content item remains of interest to users. It should be appreciated that, in order to determine whether the distributed content item remains of interest, the instructions 110 may analyze the distributed content item (e.g., a live stream) in real-time. In one example, the instructions 110 may analyze the content item to determine a presence of a target user. In this example, if the target user may be no longer appear in the distributed content item for a specified period of time, the instructions 110 may determine that distribution of the content item should be discontinued. It should be appreciated that facial tagging information (e.g., as gathered via the instructions 104) may be utilized to determine a presence of the target user.

Figure 2:
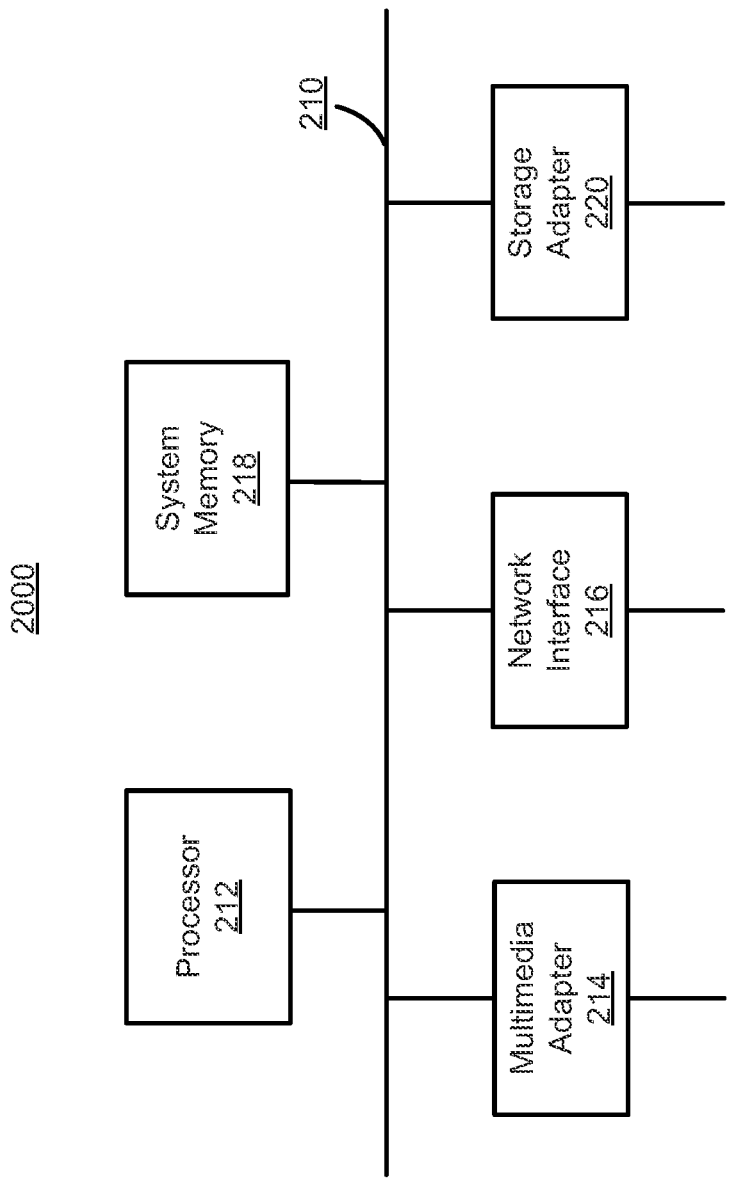
FIG. 2 illustrates a block diagram of a computer system to identify target users in a content item from a first location and distribute the content item to a second location, according to an example.

FIG. 2 illustrates a block diagram of a computer system to identify target users in a content item from a first location and distribute the content item to a second location, according to an example. In some examples, the computer system 2000 may be associated the system 100 to perform the functions and features described herein. The computer system 2000 may include, among other things, an interconnect 210, a processor 212, a multimedia adapter 214, a network interface 216, a system memory 218, and a storage adapter 220.

The interconnect 210 may interconnect various subsystems, elements, and/or components of the computer system 200. As shown, the interconnect 210 may be an abstraction that may represent any one or more separate physical buses, point-to-point connections, or both, connected by appropriate bridges, adapters, or controllers. In some examples, the interconnect 210 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 210 may allow data communication between the processor 212 and system memory 218, which may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 212 may be the central processing unit (CPU) of the computing device and may control overall operation of the computing device. In some examples, the processor 212 may accomplish this by executing software or firmware stored in system memory 218 or other data via the storage adapter 220. The processor 212 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 214 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 216 may provide the computing device with an ability to communicate with a variety of remote devices over a network (e.g., network 400 of FIG. 1A) and may include, for example, an Ethernet adapter, a Fibre Channel adapter, and/or other wired- or wireless-enabled adapter. The network interface 216 may provide a direct or indirect connection from one network element to another, and facilitate communication and between various network elements.

The storage adapter 220 may connect to a standard computer-readable medium for storage and/or retrieval of information, such as a fixed disk drive (internal or external).

Many other devices, components, elements, or subsystems (not shown) may be connected in a similar manner to the interconnect 210 or via a network (e.g., network 400 of FIG. 1A). Conversely, all of the devices shown in FIG. 2 need not be present to practice the present disclosure. The devices and subsystems can be interconnected in different ways from that shown in FIG. 2. Code to implement the dynamic approaches for payment gateway selection and payment transaction processing of the present disclosure may be stored in computer-readable storage media such as one or more of system memory 218 or other storage. Code to implement the dynamic approaches for payment gateway selection and payment transaction processing of the present disclosure may also be received via one or more interfaces and stored in memory. The operating system provided on computer system 2000 may be MS-DOS, MS-WINDOWS, OS/2, OS X, IOS, ANDROID, UNIX, Linux, or another operating system.

Figure 3:
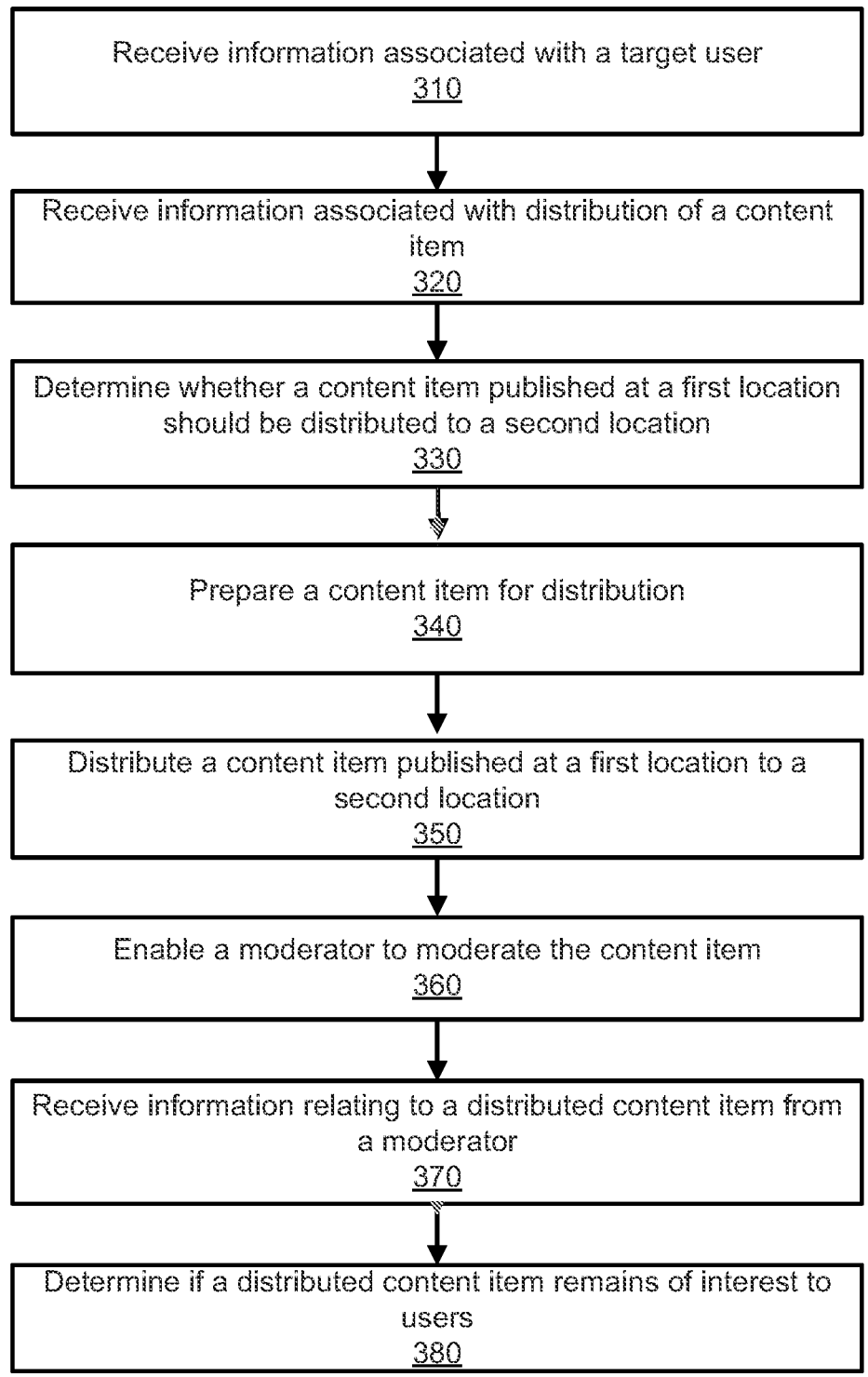
FIG. 3 illustrates a method for identifying target users in a content item from a first location and distributing the content item to a second location, according to an example.

FIG. 3 illustrates a method for identifying target users in a content item from a first location and distributing the content item to a second location, according to an example. The method illustrated in FIG. 3 is provided by way of example, as there may be a variety of ways to carry out the method described herein. Each block shown in FIG. 3 may further represent one or more processes, methods, or subroutines, and one or more of the blocks may include machine-readable instructions stored on a non-transitory computer-readable medium and executed by a processor or other type of processing circuit to perform one or more operations described herein.

Although the method 300 is primarily described as being performed by system 100 as shown in FIGS. 1A-B, the method 300 may be executed or otherwise performed by other systems, or a combination of systems. It should be appreciated that, in some examples, the method 300 may be configured to incorporate artificial intelligence (AI) or deep learning techniques, as described above.

At 310, the processor 101 may gather information relating to a target user. In some examples, the processor 101 may gather information associated with and evaluate eligibility criteria to determine if a target user may utilize distribution features availed by content platform. Also, in some examples, the processor 101 may receive preference information from a target user relating to implementation of the distribution features.

At 320, the processor 101 may gather information associated with distribution of a content item. In some examples, the processor 101 may implement facial recognition to determine an identity of a target user. In other examples, the processor may determine various aspects of the content item, including a setting and a location.

At 330, the processor 101 may determine whether a content item published at first location should be distributed to a second location. In some examples, to determine if the content item should be distributed, the processor 101 may evaluate one or more distribution criteria associated with a target user (e.g., content type) and a content platform (e.g., content item quality).

At 340, upon determining that a content item should be distributed, the processor 101 may prepare the content item for distribution. In some examples, to prepare the content item for distribution, the processor may generate a title and a content description. In some examples, the processor 101 may also prepare a notification to inform users that the content item may be published.

At 350, the processor 101 may distribute a content item published at a first location to a second location. In one example, to distribute the content item, the processor 101 may display the content item on a profile associated with a target user, and may provide a selectable thumbnail on a content "feed" for users. Also, in some examples, the processor 101 transmit a prepared notification (e.g., prepared at 340).

At 360, the processor 101 may enable a moderator to moderate a distributed content item. In some examples, to enable moderation, the processor 101 may enable selection of one or more moderators according to one or more moderator criteria.

At 370, the processor 101 may receive information (e.g., feedback) relating to a distributed content item from a moderator. In some examples, the processor 101 may provide one or more feedback mechanisms (e.g., buttons, polls, etc.) to receive the feedback from the moderator. Also, in some examples, the processor 101 may utilize the feedback from a moderator to determine whether to continue distributing the content item. In one example, if the feedback from moderators may surpass a set threshold, the processor 101 may discontinue distribution of the content item.

At 380, the processor 101 may determine if a distributed content item remains of interest to users. In some examples, the processor 101 may analyze the content item to determine a presence of a target user. In one example, if the target user may not appear in the content item for a specified period of time, the processor 101 may discontinue distribution of the content item.

By utilizing artificial intelligence (AI) based techniques and mechanisms to generate and optimize customized outreach plans based on user intent language as described herein, the systems and methods described herein may provide a simplified and transparent input process via simple, client-friendly tools configured to receive intent language pertaining to the client's business intent. Moreover, the system and methods may further automate processing of the client's intent language into one or more customizable and iteratively-optimizable outreach plans generated according to the business intent of the client features.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

It should be noted that the functionality described herein may be subject to one or more privacy policies, described below, enforced by the system 100, the external system 200, and the client devices 300 that may bar use of images for concept detection, recommendation, generation, and analysis.

In particular examples, one or more objects of a computing system may be associated with one or more privacy settings. The one or more objects may be stored on or otherwise associated with any suitable computing system or application, such as, for example, the system 100, the external system 200, and the client devices 300, a social-networking application, a messaging application, a photo-sharing application, or any other suitable computing system or application. Although the examples discussed herein may be in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" of users or other entities that should not be allowed to access certain information associated with the object. In particular examples, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the system 100, the external system 200, and the client devices 300, or shared with other systems. Although this disclosure describes using particular privacy settings in a particular manner, this disclosure contemplates using any suitable privacy settings in any suitable manner.

In particular examples, the system 100, the external system 200, and the client devices 300 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the system 100, the external system 200, and the client devices 300 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular examples, different privacy settings may be provided for different user groups or user demographics. As an example and not by way of limitation, a first user may specify that other users who attend the same university as the first user may view the first user's pictures, but that other users who are family members of the first user may not view those same pictures.

In particular examples, the system 100, the external system 200, and the client devices 300 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular examples, privacy settings may allow a first user to specify (e.g., by opting out, by not opting in) whether the system 100, the external system 200, and the client devices 300 may receive, collect, log, or store particular objects or information associated with the user for any purpose. In particular examples, privacy settings may allow the first user to specify whether particular applications or processes may access, store, or use particular objects or information associated with the user. The privacy settings may allow the first user to opt in or opt out of having objects or information accessed, stored, or used by specific applications or processes. The system 100, the external system 200, and the client devices 300 may access such information in order to provide a particular function or service to the first user, without the system 100, the external system 200, and the client devices 300 having access to that information for any other purposes. Before accessing, storing, or using such objects or information, the system 100, the external system 200, and the client devices 300 may prompt the user to provide privacy settings specifying which applications or processes, if any, may access, store, or use the object or information prior to allowing any such action. As an example and not by way of limitation, a first user may transmit a message to a second user via an application associated with the online social network (e.g., a messaging app), and may specify privacy settings that such messages should not be stored by the system 100, the external system 200, and the client devices 300.

In particular examples, a user may specify whether particular types of objects or information associated with the first user may be accessed, stored, or used by the system 100, the external system 200, and the client devices 300. As an example and not by way of limitation, the first user may specify that images sent by the first user through the system 100, the external system 200, and the client devices 300 may not be stored by the system 100, the external system 200, and the client devices 300. As another example and not by way of limitation, a first user may specify that messages sent from the first user to a particular second user may not be stored by the system 100, the external system 200, and the client devices 300. As yet another example and not by way of limitation, a first user may specify that all objects sent via a particular application may be saved by the system 100, the external system 200, and the client devices 300.

In particular examples, privacy settings may allow a first user to specify whether particular objects or information associated with the first user may be accessed from the system 100, the external system 200, and the client devices 300. The privacy settings may allow the first user to opt in or opt out of having objects or information accessed from a particular device (e.g., the phone book on a user's smart phone), from a particular application (e.g., a messaging app), or from a particular system (e.g., an email server). The system 100, the external system 200, and the client devices 300 may provide default privacy settings with respect to each device, system, or application, and/or the first user may be prompted to specify a particular privacy setting for each context. As an example and not by way of limitation, the first user may utilize a location-services feature of the system 100, the external system 200, and the client devices 300 to provide recommendations for restaurants or other places in proximity to the user. The first user's default privacy settings may specify that the system 100, the external system 200, and the client devices 300 may use location information provided from one of the client devices 300 of the first user to provide the location-based services, but that the system 100, the external system 200, and the client devices 300 may not store the location information of the first user or provide it to any external system. The first user may then update the privacy settings to allow location information to be used by a third-party image-sharing application in order to geo-tag photos.

In particular examples, privacy settings may allow a user to specify whether current, past, or projected mood, emotion, or sentiment information associated with the user may be determined, and whether particular applications or processes may access, store, or use such information. The privacy settings may allow users to opt in or opt out of having mood, emotion, or sentiment information accessed, stored, or used by specific applications or processes. The system 100, the external system 200, and the client devices 300 may predict or determine a mood, emotion, or sentiment associated with a user based on, for example, inputs provided by the user and interactions with particular objects, such as pages or content viewed by the user, posts or other content uploaded by the user, and interactions with other content of the online social network. In particular examples, the system 100, the external system 200, and the client devices 300 may use a user's previous activities and calculated moods, emotions, or sentiments to determine a present mood, emotion, or sentiment. A user who wishes to enable this functionality may indicate in their privacy settings that they opt in to the system 100, the external system 200, and the client devices 300 receiving the inputs necessary to determine the mood, emotion, or sentiment. As an example and not by way of limitation, the system 100, the external system 200, and the client devices 300 may determine that a default privacy setting is to not receive any information necessary for determining mood, emotion, or sentiment until there is an express indication from a user that the system 100, the external system 200, and the client devices 300 may do so. By contrast, if a user does not opt in to the system 100, the external system 200, and the client devices 300 receiving these inputs (or affirmatively opts out of the system 100, the external system 200, and the client devices 300 receiving these inputs), the system 100, the external system 200, and the client devices 300 may be prevented from receiving, collecting, logging, or storing these inputs or any information associated with these inputs. In particular examples, the system 100, the external system 200, and the client devices 300 may use the predicted mood, emotion, or sentiment to provide recommendations or advertisements to the user. In particular examples, if a user desires to make use of this function for specific purposes or applications, additional privacy settings may be specified by the user to opt in to using the mood, emotion, or sentiment information for the specific purposes or applications. As an example and not by way of limitation, the system 100, the external system 200, and the client devices 300 may use the user's mood, emotion, or sentiment to provide newsfeed items, pages, friends, or advertisements to a user. The user may specify in their privacy settings that the system 100, the external system 200, and the client devices 300 may determine the user's mood, emotion, or sentiment. The user may then be asked to provide additional privacy settings to indicate the purposes for which the user's mood, emotion, or sentiment may be used. The user may indicate that the system 100, the external system 200, and the client devices 300 may use his or her mood, emotion, or sentiment to provide newsfeed content and recommend pages, but not for recommending friends or advertisements. The system 100, the external system 200, and the client devices 300 may then only provide newsfeed content or pages based on user mood, emotion, or sentiment, and may not use that information for any other purpose, even if not expressly prohibited by the privacy settings.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. As another example and not by way of limitation, a company may post content associated with a product release ahead of the official launch, and specify that the content may not be visible to other users until after the product launch.

In particular examples, for particular objects or information having privacy settings specifying that they are ephemeral, the system 100, the external system 200, and the client devices 300 may be restricted in its access, storage, or use of the objects or information. The system 100, the external system 200, and the client devices 300 may temporarily access, store, or use these particular objects or information in order to facilitate particular actions of a user associated with the objects or information, and may subsequently delete the objects or information, as specified by the respective privacy settings. As an example and not by way of limitation, a first user may transmit a message to a second user, and the system 100, the external system 200, and the client devices 300 may temporarily store the message in a content data store until the second user has viewed or downloaded the message, at which point the system 100, the external system 200, and the client devices 300 may delete the message from the data store. As another example and not by way of limitation, continuing with the prior example, the message may be stored for a specified period of time (e.g., 2 weeks), after which point the system 100, the external system 200, and the client devices 300 may delete the message from the content data store.

In particular examples, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular examples, the system 100, the external system 200, and the client devices 300 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the system 100, the external system 200, and the client devices 300. The user's privacy settings may specify that such information may be used only for particular processes, such as authentication, and further specify that such information may not be shared with any external system or used for other processes or applications associated with the system 100, the external system 200, and the client devices 300. As another example and not by way of limitation, the system 100, the external system 200, and the client devices 300 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any external system or used by other processes or applications associated with the system 100, the external system 200, and the client devices 300. As another example and not by way of limitation, the system 100, the external system 200, and the client devices 300 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any external system or used by other processes or applications associated with the system 100, the external system 200, and the client devices 300.

In particular examples, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The system 100, the external system 200, and the client devices 300 may determine that this privacy setting also applies to the first image and make the first image visible only to the first user group. In particular examples, the change in privacy settings may take effect only going forward. Continuing the example above, if the first user changes privacy settings and then shares a second image, the second image may be visible only to the first user group, but the first image may remain visible to all users. In particular examples, in response to a user action to change a privacy setting, the system 100, the external system 200, and the client devices 300 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the system 100, the external system 200, and the client devices 300 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular examples, upon determining that a trigger action has occurred, the system 100, the external system 200, and the client devices 300 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (e.g., "public"). However, if the user changes his or her relationship status, the system 100, the external system 200, and the client devices 300 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the system 100, the external system 200, and the client devices 300 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the system 100, the external system 200, and the client devices 300 may send a reminder to the user to confirm his or her privacy settings every six months or after every ten photo posts. In particular examples, privacy settings may also allow users to control access to the objects or information on a per-request basis. As an example and not by way of limitation, the system 100, the external system 200, and the client devices 300 may notify the user whenever an external system attempts to access information associated with the user, and require the user to provide verification that access should be allowed before proceeding.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system, comprising:
a processor; and
a memory storing instructions, which when executed by the processor, cause the processor to:
receive information associated with a content item published in a first location, wherein the information associated with the content item comprises a category and a content item type;
receive information associated with a target user associated with the content item, wherein the information associated with the target user comprises an indication that the target user has activated a distribution feature, a preference related to distribution of the content item, a state or status of the target user, and an indication if the target user is moving in or out of the content item;
determine, based on one or more eligibility criteria associated with the target user and the information associated with the content item, the information associated with the target user, and a real-time analysis of the content item during publication and other associated content items with respect to the target user, if the content item should be distributed to a second location associated with the target user, wherein the eligibility criteria comprises criteria to determine whether the target user is to be availed use of the distribution feature, and wherein the information associated with the content item comprises a context and a setting associated with the content item;
prepare, in an event it is determined that the content item should be distributed to the second location associated with the target user, the content item for distribution to the second location associated with the target user by generating descriptive information associated with distribution of the content item to the second location associated with the target user;
distribute the content item to the second location associated with the target user to republish the content item, wherein the distributing the content item is based on a sufficient number of moderators recommending the content item; and
analyze feedback to determine whether to continue distributing the content item to the second location associated with the target user, comprising determining in real-time if the content item remains of interest, determining if the target user is no longer appearing in the content item for a specified period of time, and analyzing information related to a decision to discontinue distributing the content item.

2. The system of claim 1, wherein receiving the information associated with the content item comprises determining an identity of the target user.

3. The system of claim 2, wherein determining the identity of the target user comprises using at least one of computer vision, machine learning (ML), or artificial intelligence (AI).

4. The system of claim 1, wherein determining if the content item should be distributed to the second location associated with the target user is based at least in part on receiving instructions from a moderator to moderate distribution of the content item.

5. The system of claim 4, wherein the instructions received from the moderator is to discontinue distribution of the content item.

6. The system of claim 1, wherein determining if the content item should be distributed to the second location associated with the target user is based on whether the content item remains of interest to users.

7. The system of claim 1, wherein the information associated with the target user comprises a preference associated with the content item.

8. A method, comprising:
receiving, by a processor, information associated with a content item published in a first location, wherein the information associated with the content item comprises a category and a content item type;
receiving information associated with a target user associated with the content item, wherein the information associated with the target user comprises an indication that the target user has activated a distribution feature, a preference related to distribution of the content item, a state or status of the target user, and an indication if the target user is moving in or out of the content item;
determining, based on one or more eligibility criteria associated with the target user and the information associated with the content item, the information associated with the target user, and a real-time analysis of the content item during publication and other associated content items with respect to the target user, if the content item should be distributed to a second location associated with the target user, wherein the eligibility criteria comprises criteria to determine whether the target user is to be availed use of the distribution feature, and wherein the information associated with the content item comprises a context and a setting associated with the content item;
preparing, in an event it is determined that the content item should be distributed to the second location associated with the target user, the content item for distribution to the second location associated with the target user by generating descriptive information associated with distribution of the content item to the second location associated with the target user;
distributing the content item to the second location associated with the target user to republish the content item, wherein the distributing the content item is based on a sufficient number of moderators recommending the content item; and
analyzing feedback to determine whether to continue distributing the content item to the second location associated with the target user, comprising determining in real-time if the content item remains of interest, determining if the target user is no longer appearing in the content item for a specified period of time, and analyzing information related to a decision to discontinue distributing the content item.

9. The method of claim 8, wherein receiving the information associated with the content item comprises determining an identity of the target user.

10. The method of claim 9, wherein determining the identity of the target user comprises using at least one of computer vision, machine learning (ML), or artificial intelligence (AI).

11. The method of claim 8, wherein determining if the content item should be distributed to the second location associated with the target user is based at least in part on receiving instructions from a moderator to moderate distribution of the content item.

12. The method of claim 11, wherein the instructions received from the moderator is to discontinue distribution of the content item.

13. The method of claim 8, wherein determining if the content item should be distributed to the second location associated with the target user is based on whether the content item remains of interest to users.

14. The method of claim 8, wherein the information associated with the target user comprises a preference associated with the content item.

15. A non-transitory computer-readable storage medium having an executable stored thereon, which when executed instructs a processor to, comprising:
receiving, by a processor, information associated with a content item published in a first location, wherein the information associated with the content item comprises a category and a content item type;
receiving information associated with a target user associated with the content item, wherein the information associated with the target user comprises an indication that the target user has activated a distribution feature, a preference related to distribution of the content item, a state or status of the target user, and an indication if the target user is moving in or out of the content item;
determining, based on one or more eligibility criteria associated with the target user and the information associated with the content item, the information associated with the target user, and a real-time analysis of the content item during publication and other associated content items with respect to the target user, if the content item should be distributed to a second location associated with the target user, wherein the eligibility criteria comprises criteria to determine whether the target user is to be availed use of the distribution feature, and wherein the information associated with the content item comprises a context and a setting associated with the content item;
preparing, in an event it is determined that the content item should be distributed to the second location associated with the target user, the content item for distribution to the second location associated with the target user by generating descriptive information associated with distribution of the content item to the second location associated with the target user;
distributing the content item to the second location associated with the target user to republish the content item, wherein the distributing the content item is based on a sufficient number of moderators recommending the content item; and
analyzing feedback to determine whether to continue distributing the content item to the second location associated with the target user, comprising determining in real-time if the content item remains of interest, determining if the target user is no longer appearing in the content item for a specified period of time, and analyzing information related to a decision to discontinue distributing the content item.

16. The non-transitory computer-readable storage medium of claim 15, wherein receiving the information associated with the content item comprises determining an identity of the target user using at least one of computer vision, machine learning (ML), or artificial intelligence (AI).

17. The non-transitory computer-readable storage medium of claim 15, wherein determining if the content item should be distributed to the second location associated with the target user is based at least in part on receiving instructions from a moderator to moderate distribution of the content item.

18. The non-transitory computer-readable storage medium of claim 17, wherein the instructions received from the moderator is to discontinue distribution of the content item.

19. The non-transitory computer-readable storage medium of claim 15, wherein determining if the content item should be distributed to the second location associated with the target user is based on whether the content item remains of interest to users.

20. The non-transitory computer-readable storage medium of claim 15, wherein the information associated with the target user comprises a preference associated with the content item.

\* \* \* \* \*